(12) United States Patent
Deigmöller et al.

(10) Patent No.: US 8,933,797 B2
(45) Date of Patent: Jan. 13, 2015

(54) VIDEO-BASED WARNING SYSTEM FOR A VEHICLE

(75) Inventors: Jörg Deigmöller, Frankfurt am Main (DE); Julian Eggert, Obertshausen (DE); Herbert Janssen, Dreieich (DE); Oliver Fuchs, Rüdesheim am Rhein (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 54 days.

(21) Appl. No.: 13/610,924

(22) Filed: Sep. 12, 2012

(65) Prior Publication Data

US 2013/0088343 A1    Apr. 11, 2013

(30) Foreign Application Priority Data

Oct. 6, 2011    (EP) .................................... 11184090

(51) Int. Cl.
| | |
|---|---|
| *B60Q 1/00* | (2006.01) |
| *G06T 7/20* | (2006.01) |
| *G08G 1/16* | (2006.01) |
| *B60W 50/14* | (2012.01) |

(52) U.S. Cl.
CPC .............. *G06T 7/2006* (2013.01); *G08G 1/166* (2013.01); *B60W 50/14* (2013.01); *B60W 2420/42* (2013.01); *G06T 2207/30261* (2013.01)
USPC ........... 340/436; 340/435; 340/453; 348/148; 382/103

(58) Field of Classification Search
CPC ....................................................... B60Q 1/525
USPC ........................... 340/435, 436, 453; 382/103
See application file for complete search history.

(56) References Cited

U.S. PATENT DOCUMENTS

| | | | | |
|---|---|---|---|---|
| 8,040,227 B2* | 10/2011 | Friedrichs et al. | ............ | 340/436 |
| 2005/0100192 A1* | 5/2005 | Fujimura et al. | ............... | 382/103 |

(Continued)

FOREIGN PATENT DOCUMENTS

| | | |
|---|---|---|
| DE | 102009038906 A1 | 3/2011 |
| EP | 1515295 A2 | 3/2005 |
| EP | 2270765 A1 | 1/2011 |

OTHER PUBLICATIONS

Koehlen et al., "Erster radarbasierter Spurwechselassistent für motorisierte Zweiräder", FAS 2011-7th Workshop on driver assistance systems, TU Braunschweig, pp. 34-43.

(Continued)

*Primary Examiner* — Benjamin C Lee
*Assistant Examiner* — Israel Daramola
(74) *Attorney, Agent, or Firm* — Squire Patton Boggs (US) LLP (57) ABSTRACT

The present invention proposes a warning system that can be implemented in any kind of vehicle, in order to efficiently detect moving objects. The system utilizes at least one camera for a continuous imaging of the surroundings of the vehicle. Thereby, moving objects can be monitored. A computing unit is programmed to estimate a motion of any moving object based on a pixel motion in the camera image. If a dangerously moving object is detected, a warning unit can be used for issuing a warning signal. To take such a decision, the estimated motion of at least one of the moving objects can be correlated or compared to predetermined motion patterns.

15 Claims, 5 Drawing Sheets

(56) References Cited

U.S. PATENT DOCUMENTS

| | | | | |
|---|---|---|---|---|
| 2008/0042812 A1* | 2/2008 | Dunsmoir et al. | | 340/435 |
| 2009/0174536 A1* | 7/2009 | Rao | | 340/436 |
| 2009/0278675 A1* | 11/2009 | Chen | | 340/453 |
| 2011/0285850 A1* | 11/2011 | Lu et al. | | 348/148 |
| 2013/0027196 A1* | 1/2013 | Yankun et al. | | 340/435 |

OTHER PUBLICATIONS

S. Mota et al., "Motion Driven Segmentation Scheme for Car Overtaking Sequences", Proceedings of 10th International Conference on Vision in Vehicles VIV'2003, pp. 1-7 (8 pages).

M.A. Sotelo et al., "Blind spot detection using vision for automotive applications", Journal of Zhejiang University—Science A 2008 9(10): pp. 1369-1372.

J. Wang et al., "Overtaking Vehicle Detection Using Dynamic and Quasi-Static Background Modeling", Proceedings of the 2005 IEEE Computer Society Conference on Computer Vision and Pattern Recognition (CVPR' 05).

J. Klappstein et al., "Moving Object Segmentation using Optical Flow and Depth Information", PSIVT 2009, pp. 1-12.

J. Eggert et al., "Layered Motion Segmentation with a Competitive Recurrent Network", ICANN 2010, pp. 1-10.

Wikipedia, "Epipolar Geometry", http://en.wikipedia.org/wiki/Epipolar_geometry, last downloaded Sep. 11, 2012, pp. 1-4.

Wikipedia, "Homography", http://en.wikipedia.org/wiki/Homography, last downloaded Sep. 11, 2012, pp. 1-4.

Prankl et al., "Incremental Model Selection for Detection and Tracking of Planar Surfaces", BMVC 2010, pp. 1-12.

EP Search Report dated May 4, 2012 corresponding to European patent application No. 11184090.6.

\* cited by examiner

VIDEO-BASED WARNING SYSTEM FOR A VEHICLE

BACKGROUND OF THE INVENTION

The present invention describes a warning system and a warning method for a vehicle like a car, a truck or a motorcycle/scooter. The warning system is used for detecting moving objects. To this end the warning system uses a camera to sense the surroundings of the vehicle, and a computing unit to determine moving objects form the camera image. The present invention is directed in particular to monitoring the rear of a motorcycle for detecting approaching objects that might pose a risk to the driver.

STATE OF THE ART

A prototype with a similar function but with a radar system instead of an optical camera to sense moving objects has been built recently (see 'Koehlen et al., *Erster Radarbasierter Spurwechselassistent fuer motorisierte Zweiraeder*, FAS 2011-7th workshop on driver assistance systems, TU Braunschweig). However, one conclusion from this research project was that a different sensor, which is smaller and cheaper than a radar system is preferable for future applications.

Other prior art systems that are able to warn about moving, in particular approaching objects like other vehicles have so far only be implemented in cars but not in motorcycles. The prior art systems are moreover mainly designed for blind spot detection (see S. Mota et al., *Motion driven segmentation scheme for car overtaking sequences*, Proceedings of 10th International Conference on Vision in Vehicles VIV '2003 and M. Á. Sotelo et al., *Blind spot detection using vision for automotive applications*, Journal of Zhejiang University—Science A 9(10):1369-1372).

Blind spot detection, however, provides only a limited scenario, since it mainly senses to the sides of the vehicle. This reduces the degrees of freedom of possible motion patterns. In particular a full rear-view cannot be provided to detect objects approaching from behind.

To further improve the performance of such blind spot detection systems, some applications additionally made use of appearance based methods, like object recognition (see J. Wang et al, *Overtaking Vehicle Detection Using Dynamic and Quasi-Static Background Modeling*, Proceedings of the 2005 IEEE Computer Society Conference on Computer Vision and Pattern Recognition (CVPR '05)).

Since the above systems have been designed specifically for cars, none of the systems can cope with a leaning of the vehicle, as it occurs for example for a motorcycle when driving though curves.

TARGET OF THE INVENTION

The warning sensing system of the present invention has been developed to improve the existing state of the art. In particular, the warning system of the present invention has been developed to cope with more degrees of freedom than common vision based blind spot detectors can. In particular, the warning system was constructed to be able to handle also a leaning of the vehicle. The warning system is therefore particularly well suited for the use in motorcycles. A leaning of the vehicle results in a rotation of the camera image around the camera axis.

The system proposed in the present invention solves the above-identified problems by using motion information—or more precisely optical flow within a video stream—to detect moving, particularly approaching objects. The detection of moving objects is achieved in a two step process in the present invention. At first the motion of individual pixels in an image sequence is estimated, and afterwards the measured motion information is separated into corresponding regions.

Extracting and processing motion information from video images significantly differs from using depth information, which could be estimated by e.g. stereo-cameras or a radar sensor. For sensors that measure the depth, the range ends at a certain distance. For motion estimation, however, there is no fixed distance range, because the detection depends on the speed of the moving (e.g. approaching) object. In other words, the higher a measurable motion of an approaching object is, the earlier it can be detected.

Modeling of motion patterns in video images has been heavily discussed in the existing prior art literature (see for example Wikipedia, *Epipolar Geometry*, http://en.wikipedia.org/wiki/Epipolar_geometry or *Homography* http://en.wikipedia.org/wiki/Homography). An ongoing problem is the fitting of parameters of such patterns under real world conditions. For this purpose, robust regression frameworks are required that separate reliable from unreliable motion information.

The separation is usually done iteratively, where each motion pattern is extracted one after the other (see J. Klappstein et al., *Moving Object Segmentation using Optical Flow and Depth Information*, PSIVT 2009 or J. Prankl et al., *Incremental Model Selection for Detection and Tracking of Planar Surfaces*, BMVC 2010]. A rather infrequently used method is to find multiple types of motion in parallel (J. Eggert et al., *Layered Motion Segmentation with a Competitive Recurrent Network*, ICANN 2010).

The present invention is not limited to one of these procedures, but rather to the properties of fitted motion patterns that occur for the mentioned application scope.

The main target of the warning system of the present invention is to warn the driver of the vehicle about other, particularly moving objects like other vehicles on the road. Especially such other vehicles should be detected that are

- preparing to overtake (on the lane neighboring the lane the vehicle drives on),
- approaching on the same lane the vehicle drives on
- approaching from behind, while the driver of the vehicle has stopped or stands e.g. at an intersection
- moving behind the vehicle, e.g. when merging at a highway ramp.

SUMMARY OF THE INVENTION

The present invention is directed to a warning system for a vehicle to detect moving objects, wherein the system comprises at least one camera for continuously imaging the surroundings of the vehicle, a computing unit for estimating a motion of moving objects based on a pixel motion in the camera image, a warning unit for issuing a warning signal, if the estimated motion of at least one of the moving objects follows a predetermined motion pattern.

The warning signal may be supplied to at least one of:
- haptic (e.g. vibrating handles or seat), acoustic or visual indication means,
- an actuator of the vehicle acting on the state of the vehicle, such as e.g. brakes, accelerator or steering, and/or
- safety devices, such as e.g. airbag, ABS or auxiliary wheels of a saddle-ridden vehicle.

Preferably, the warning signal issued by the warning unit is to be understood as an indicative signal like an optical or acoustical warning signal. Alternatively or additionally the computing unit or the warning unit could also cause an effector of the vehicle, such as e.g. a steering wheel, an accelerator, or a brake, to be operated. Also possible would be an automatic effecting of other safety systems, e.g. a tightening of the seat belt or initiating or even a release of the air bag. Thus, the warning system also has the possibility to implement an improved driver assistance system.

Compared to radar, cameras are passive. That means there is no danger of interference with other active sensors of the vehicle or of other vehicles. More importantly, a camera can e.g. provide a direct rear-view for the driver of the vehicle that is more comprehensive than the two back mirror images. The camera mounting should not interfere with other functions like backlights, luggage carrier, side bags etc. of the vehicle. Further, the camera image should not be negatively affected by the backlights of the vehicle, in particular if the vehicle is a motorcycle.

Preferably, the computing unit is adapted to compute the pixel motion between consecutive frames of the camera image, perform a motion segmentation that divides the computed pixel motion into a motion of stationary background objects and a motion of moving objects, compare the results of the motion segmentation for the motion of moving objects with predetermined motion patterns to determine, whether to issue a warning signal or not. In this way moving objects can be determined rapidly, efficiently, and reliably.

Preferably, the computing unit is adapted to detect from the pixel motion in the camera image a rotation, scaling and/or translation of the at least one camera, and to compensate during the motion segmentation for any detected rotation, scaling and/or translation of the camera. In addition to a rotation determined from the pixel motion, a suited sensor like an acceleration sensor can be used to detect the amount of tilt or leaning of the vehicle. The warning system of the present invention can thus also handle a leaning of the vehicle. The warning system is therefore also well usable for motorcycles.

Preferably, the computing unit is adapted to detect the motion of the background objects in respect to the camera based on a contracting motion of pixels, which move on an epipolar line towards a focus of concentration (FOC) in the camera image, and to detect the motion of the moving objects based on an expanding motion of pixels, which do not move towards the FOC.

For a rear-facing camera, while the vehicle is moving forwards, a contracting motion of pixels in two consecutive video images is caused. In other words, all pixels move towards a so called focus of contraction (FOC). The line that crosses the FOC and the two points describing the positions of a moving pixel is also called epipolar line. The above is only valid for pixels that correspond to static elements in the real world. Other elements, like moving objects, cause motion that is not pointing to the FOC. Therefore a separation of the motions of stationary objects and moving objects is possible.

Preferably, the computing unit is adapted to disregard motion information of pixels, which do not follow one of the contracting and expanding motions obtained during the motion segmentation. The reliability of the system can be increased, and unnecessary processing can be avoided.

Preferably, the warning unit is at least one warning light provided on the dashboard or on a side-mirror of the vehicle. On the side-mirror the warning light is positioned ideally, so the driver can immediately identify also the reason for the issuing of the warning light. The warning unit can warn on either one or on both of the side-mirrors of the vehicle, preferably only on the side, on which the dangerously moving object is detected. A warning light can also be installed in the inner main rear-mirror, if such a mirror is present.

Preferably, the warning unit is a live video display of the camera that is graphically overlaid on the dashboard of the vehicle with a warning display. Since the dashboard is frequently viewed by the driver, the warning display is well placed. Due to the live video, in particular for a motorcycle, which has no inner rear-mirror like a car, the driver can be provided with a full rear-view in a convenient manner.

Preferably, the warning unit is adapted to highlight the position of the moving object on the live video display. The highlighting can additionally catch the attention of the user.

Preferably, the warning unit is disposed so as to issue a warning signal in direction of a moving object on the rear-side of the vehicle. Approaching vehicles could be warned, for example, in case the warning system detects a breaking vehicle in front of the vehicle (e.g. due to a traffic jam). The conventional warning lights of vehicles could in this case issue the warning signal.

Preferably, the warning unit or the computing unit can cause an effector of the vehicle to be operated in case a warning signal is issued. The advantages have been described above.

Preferably, the camera is rear facing in respect to the driving direction of the vehicle.

Preferably, the camera is disposed on the rear-side of the vehicle and is protected against dirt and water. Therefore, a shield or a water-tight casing can be used. The lifetime of the camera can be increased.

The present invention is further directed to a warning method to detect moving objects, wherein the method comprises continuously imaging the surroundings of a vehicle, estimating a motion of moving objects based on a pixel motion in the camera image, issuing a warning signal, if the estimated motion of at least one of the moving objects follows a predetermined motion pattern.

Preferably the warning method, further comprises computing the pixel motion between consecutive frames of the image, performing a motion segmentation that divides the computed pixel motion into a motion of stationary background objects and a motion of moving objects, comparing the results of the motion segmentation for the motion of the moving objects with predetermined motion patterns to determine, whether to issue a warning signal or not.

The warning method can be used in any vehicle, like a car, truck or motorcycle. The method provides the same advantages that have been described for the warning system above.

In the following the present invention will be described in more detail with respect to the attached figures.

DETAIL OF THE INVENTION

Figure 1:
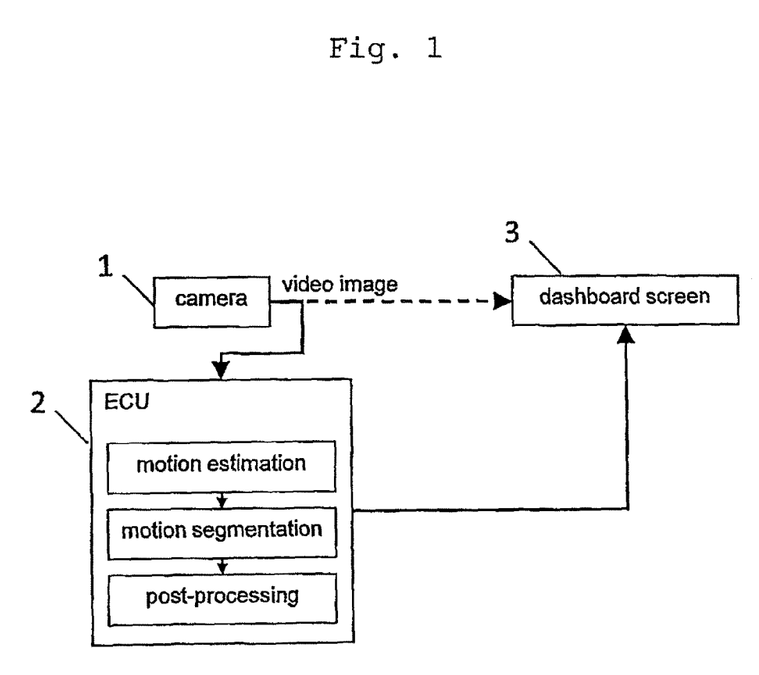
FIG. 1 shows the components of the warning system.
Figure 2:
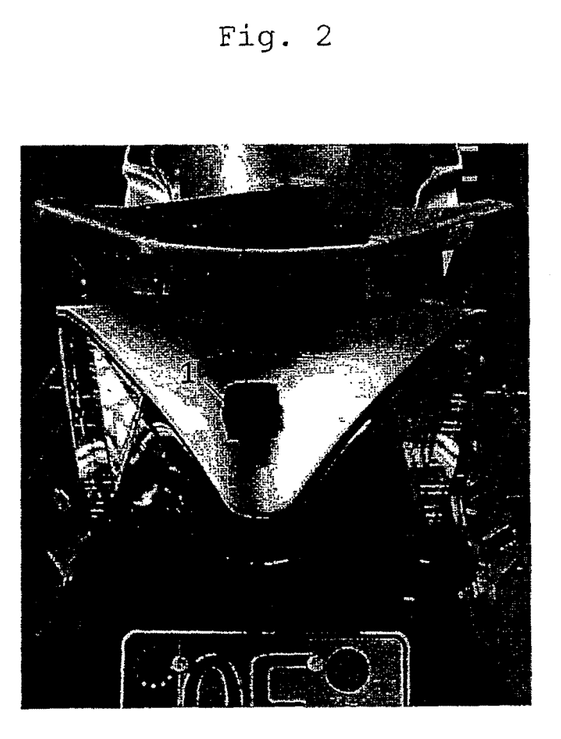
FIG. 2 shows a rear-view camera mounted on a motorcycle.

FIG. 1 shows the main parts of the warning system of the present invention. The warning system is comprised of a camera 1 with an image sensor. The image sensor of the camera 1 can be a conventional CMOS or CCD, but the camera is not limited to any specific type. The camera 1 is preferably a rear-facing or rear-view camera. Therefore it is preferably attached at the rear or back of the vehicle (inside or outside). As an example, FIG. 2 shows a rear-facing camera 1 attached to the back of a motorcycle. The camera 1 mounting should not interfere with other functions like the backlights, luggage carrier, side bags etc. of the vehicle. Also the camera image should not be negatively affected by the backlights of the motorcycle. However, the camera should be well protected against dirt and water. This could be achieved by a casing or a shield that keeps dirt, dust and water out of the camera 1.

The camera 1 has an output that delivers a video image signal to a computing unit 2. The computing unit 2 is laid out to perform at least three functions on the video image: motion estimation, motion segmentation and post-processing. A more detailed explanation will be given below. The computing unit 2 can be a conventional processor or micro-processor. The computing unit 2 can be integrated with other electrical systems of the vehicle.

The warning system further comprises a warning unit 3. The warning unit 3 receives a signal from the computing unit 2, namely an instruction whether to issue a warning signal or not. The computing unit 2 controls the warning unit 3. The warning unit 3 can for example be a video display of the rear-facing camera that is displayed as part of the dashboard of the vehicle. The dashed line in FIG. 1 indicates a case where the video image signal of the camera 1 is not only provided to the computing unit 2, but also provided to the dashboard screen (as warning unit 3) for a live view of the camera image. Alternatively, the warning unit 3 can be in form of simple warning lights provided on the dashboard or on one or more side-mirrors.

Figure 3A:
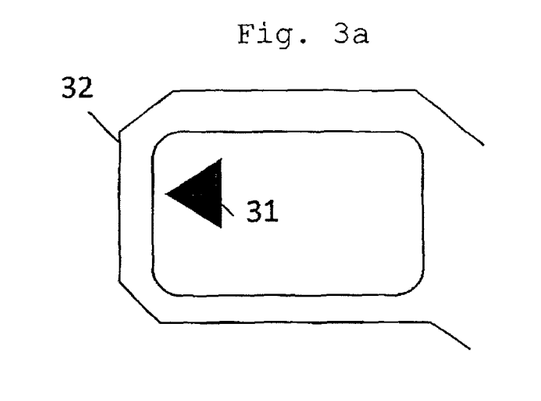
FIG. 3a shows a warning light on a side mirror.

FIG. 3a shows a side mirror 32 of a vehicle. The warning unit 3 can be integrated into the mirror as a warning light 31. The warning light 31 can for example be realized by one or more LEDs. An illuminated or blinking warning light 31 can warn the driver of any dangerously moving object, e.g. an object rapidly approaching from behind or overtaking the vehicle. The warning unit 3 could additionally or optionally also issue an acoustic signal. The warning unit 3 could be a warning light 31 integrated into each side mirror and/or the main rear mirror. Then the computing unit 2 could control the warning unit 3 to issue a warning signal on a selected one of the warning lights 31. For example, if another vehicle were to overtake on the lane on the left side of the lane the vehicle is driving on, the warning light 31 on the left side mirror 32 of the vehicle could be operated. If another vehicle were to overtake on the lane on the right side of the lane the vehicle is driving on, the warning light 31 on the right side mirror 32 of the vehicle could be operated. If, for example a vehicle were to approach from the rear, the warning light 31 in the main rear mirror could be operated. The driver thus can intuitively grasp the danger and react accordingly.

Figure 3B:
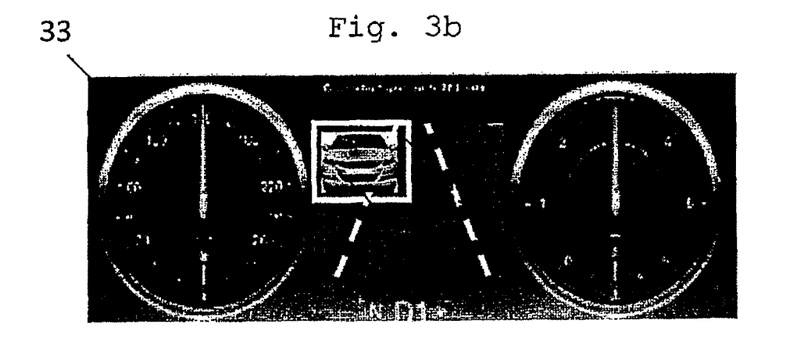
FIG. 3b shows a rear view video display with a warning overlay.

FIG. 3b shows an alternative, where the warning unit 3 is a live video display 34 of the camera image. The live video display can be shown on the dashboard screen 32 of the vehicle, on which e.g. also a tachometer and/or a revolution counter and/or other information can be displayed. If the computing unit 2 detects a condition, which requires issuing a warning signal, a warning display 34 could be graphically overlaid with the live video display. In FIG. 3b the warning display is indicated as a frame around the live video display 34, wherein the frame could be highlighted or blinking. However, other visual warning displays 35 on the dashboard screen are possible. Again the visual signal can be supported by an acoustic warning signal.

The computing unit 2 could in case of a warning condition also cause an effector or actuator of the vehicle to be operated. The effector could be e.g. the steering wheel/steering bar, the accelerator, or the brake etc. of the vehicle. It is also possible to control via the computing unit 2 other safety systems of the vehicle in case of a warning situation. For example, if an approaching object is detected, a tightening of the seat belt or even a release of the air bag could be initialized.

As described above the computing unit 2 is to perform motion estimation, motion segmentation and post-processing on the video image signal delivered by the camera 1. The motion estimation of a moving object can be based on a pixel motion in the camera image.

Figure 4:
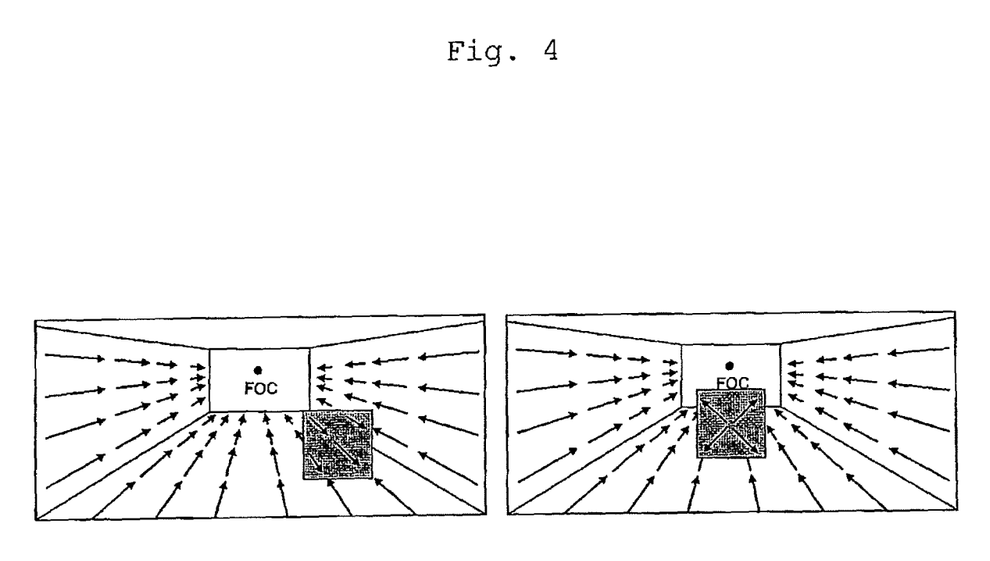
FIG. 4 shows examples of background motion caused by ego-motion and motion caused by approaching object motion.

FIG. 4 shows the case of a rear-facing camera 1. In particular a case is shown, in which the vehicle is moving forwards. The relative motion of the camera 1 on the forwards moving vehicle causes a contracting motion of pixels in two consecutive video images. In other words, all pixels that correspond to static or stationary objects in the real world move towards a so called focus of contraction (FOC). The line that crosses the FOC and the two points describing the positions of a moving pixel is also called epipolar line. Other elements or objects, like moving objects, cause a motion that is not pointing to the FOC. Approaching objects for example exhibit an expanding motion of pixels. The effect is most significant if objects are moving perpendicular or even in the same direction as the vehicle does.

The occurrence of different types of motion in the video image, caused by the effect described above, allows for a motion separation or segmentation. The above patterns can be separated based on the measured pixel motion information. For the special case where the camera views to the back of the vehicle, approaching objects cause an expanding pixel motion, whereas the background motion causes a contracting motion of pixels.

Figure 5:
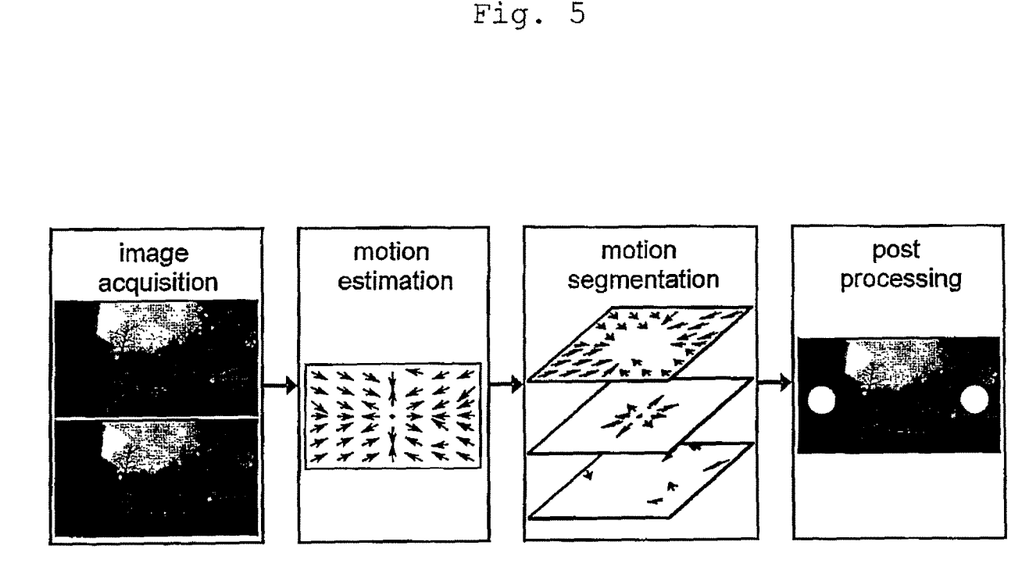
FIG. 5 shows processing steps to detect moving, particularly approaching, vehicles.

The processing steps to detect moving or approaching or overtaking objects, can be split into four major steps. The four major steps are illustrated in FIG. 5 from the left to the right side for the case of a rear-facing camera and an object approaching the vehicle from behind.

Firstly, two consecutive video images are acquired by the camera 1, and the pixel motion between those is computed by the computing unit 2.

Secondly, a motion estimation method is used. For this purpose, known motion estimation methods as described in the state of the art section can be used. The motion estimation delivers results for a pixel motion between two consecutive frames of the video image signal.

Thirdly, the obtained pixel motion is divided into a background motion (i.e. relative motion of stationary objects) and an approaching object motion, based on the assumptions made above. Namely, the contracting and expanding motions are used to distinguish objects. This step is called motion segmentation. The model for motion segmentation includes rotation, scaling and translation of the camera 1. Therefore, the system can also cope with a leaning of the vehicle. All motion information that cannot be assigned to any of the above mentioned motion patterns (expanding or contracting) are assumed to be unreliable motion information (e.g. due to wrong measurements).

Finally, the computing unit 2 performs post-processing. In post-processing the computing unit 2 makes a decision that relies on the previously executed motion segmentation. The computing unit 2 can be provided with a memory, onto which predetermined motion patterns (e.g. an approaching other vehicle, an overtaking other vehicle, a breaking other vehicle etc. are stored). The computing unit 2 can compare the motion pattern for a moving object that has been obtained in the motion segmentation step with the predetermined motion patterns. Then the computing unit 2 can make a decision, whether one of the predetermined motion patterns is fulfilled. In case the computing unit 2 determines that a predetermined pattern is matched or matched with an error below a predetermined threshold value, it provides a command to issue a warning signal to the warning unit 3.

In summary the warning system of the present invention can be implemented in any kind of vehicle, in order to efficiently detect moving objects. The system utilizes at least one camera for a continuous imaging of the surroundings of the vehicle. Thereby, moving objects are also monitored. A computing unit is programmed to estimate a motion of any moving object based on a pixel motion in the camera image. If a dangerously moving object is detected, a warning unit can be used for issuing a warning signal. To take such a decision, the estimated motion of at least one of the moving objects can be correlated or compared to predetermined motion patterns.

The invention claimed is:

1. Warning system for a vehicle to detect moving objects, wherein the system comprises
   at least one camera for preferably continuously imaging the surroundings of the vehicle, wherein the camera is rear facing in respect to the driving direction of the vehicle;
   a computing unit for estimating a motion of moving objects based on a pixel motion in the image of said camera, wherein the computing unit is adapted to compute the pixel motion between consecutive frames of the camera image and to perform a motion segmentation that divides the computed pixel motion into a motion of stationary background objects and a motion of moving objects by detecting a motion of the background objects in respect to the camera based on a contracting motion of pixels and by detecting a motion of the moving objects based on an expanding motion of pixels, which do not move towards the focus of concentration;
   a warning unit for issuing a warning signal, if the estimated motion of at least one of the moving objects follows a predetermined motion pattern.

2. Warning system according to claim 1, wherein the computing unit is adapted to
   compare the results of the motion segmentation for the motion of moving objects with predetermined motion patterns to determine, whether to issue a warning signal or not.

3. Warning system according to claim 2, wherein the computing unit is adapted to
   detect from the pixel motion in the camera image a rotation, scaling and/or translation of the at least one camera; and
   to compensate during the motion segmentation for any detected rotation, scaling and/or translation of the camera.

4. Warning system according to claim 2, wherein the computing unit is adapted to disregard motion information of pixels, which do not follow one of the contracting and expanding motions obtained during the motion segmentation.

5. Warning system according to claim 1, wherein the warning unit is at least one warning light provided on the dashboard or on a side-mirror of the vehicle.

6. Warning system according to claim 1, wherein the warning unit is a live video display of the camera that is graphically overlaid on the dashboard of the vehicle with a warning display.

7. Warning system according to claim 6, wherein the warning unit is adapted to highlight the position of the moving object on the live video display.

8. Warning system according to claim 1, wherein the warning unit is disposed so as to issue a warning signal in direction of a moving object on the rear-side of the vehicle.

9. Warning system according to claim 1, wherein the camera is disposed on the rear-side of the vehicle and is protected against dirt and water.

10. Warning system according to claim 1, wherein the warning signal is supplied to at least one of:
    haptic, e.g. vibrating handles or seat, acoustic or visual indication means,
    an actuator of the vehicle acting on the state of the vehicle, such as e.g. brakes, accelerator or steering, and/or
    safety devices, such as e.g. airbag, ABS or auxiliary wheels of a saddle-ridden vehicle.

11. Vehicle, especially saddle-ridden vehicle like motorcycle or scooter, being provided with a warning system according to claim 1.

12. Warning method to detect moving objects, wherein the method comprises
    continuously imaging the rear facing, in respect to the driving direction, surroundings of a saddle-ridden vehicle;
    estimating a motion of moving objects based on a pixel motion in the camera image, by computing the pixel motion between consecutive frames of a camera image and performing a motion segmentation that divides the computed pixel motion into a motion of stationary background objects and a motion of moving objects by detecting a motion of the background objects in respect to the camera based on a contracting motion of pixels and by detecting a motion of the moving objects based on an expanding motion of pixels, which do not move towards the focus of concentration;
    issuing a warning signal, if the estimated motion of at least one of the moving objects follows a predetermined motion pattern.

13. Warning method according to claim 11, further comprising
    computing the pixel motion between consecutive frames of the image;
    performing a motion segmentation that divides the computed pixel motion into a motion of stationary background objects and a motion of moving objects;
    comparing the results of the motion segmentation for the motion of the moving objects with predetermined motion patterns to determine, whether to issue a warning signal or not.

14. A computer software program product, performing a method according to claim 13 when run on a computing device of a vehicle.

15. A computer software program product, performing a method according to claim 2 when run on a computing device of a vehicle.

* * * * *